(12) United States Patent
Kimmel

(10) Patent No.: US 8,186,953 B1
(45) Date of Patent: May 29, 2012

(54) MULTIPLE PIECE TURBINE BLADE

(75) Inventor: Keith D Kimmel, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 612 days.

(21) Appl. No.: 12/486,179

(22) Filed: Jun. 17, 2009

(51) Int. Cl.
*F01D 5/18* (2006.01)
(52) U.S. Cl. .................................... 416/97 R
(58) Field of Classification Search ............ 416/97 R, 416/96 A, 233, 248, 225, 226
See application file for complete search history.

(56) References Cited

U.S. PATENT DOCUMENTS 2,848,192 A * 8/1958 Hayes ..................... 416/90 R
5,626,462 A * 5/1997 Jackson et al. ............. 416/97 R

* cited by examiner

*Primary Examiner* — Richard Edgar
(74) *Attorney, Agent, or Firm* — John Ryznic

(57) ABSTRACT

A turbine rotor blade with a spar and shell construction, the spar including an internal cooling supply channel extending from an inlet end on a root section and ending near the tip end, and a plurality of external cooling channels formed on both side of the spar, where a middle external cooling channel is connected to the internal cooling supply channels through a row of holes located at a middle section of the channels. The spar and the shell are held together by hooks that define serpentine flow passages for the cooling air and include an upper serpentine flow circuit and a lower serpentine flow circuit. the serpentine flow circuits all discharge into a leading edge passage or a trailing edge passage.

11 Claims, 4 Drawing Sheets

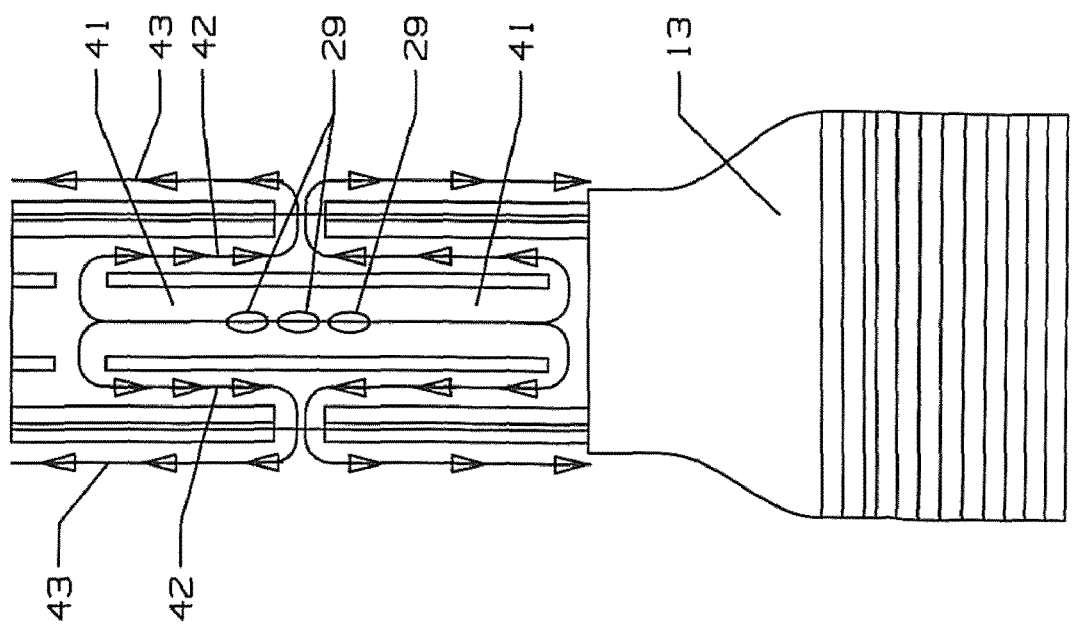

MULTIPLE PIECE TURBINE BLADE

GOVERNMENT LICENSE RIGHTS

This invention was made with Government support under contract number DE-FG02-07ER84668 awarded by Department of Energy. The Government has certain rights in the invention.

CROSS-REFERENCE TO RELATED APPLICATIONS

None.

BACKGROUND OF THE INVENTION

1. Field of the Invention

The present invention relates generally to a gas turbine engine, and more specifically to an air cooled turbine rotor blade with a spar and shell construction.

2. Description of the Related Art Including Information Disclosed Under 37 CFR 1.97 and 1.98

A gas turbine engine, such as an industrial gas turbine (IGT) engine, compresses air that is then burned with a fuel to produce a high temperature gas flow, which is then passed through a turbine having multiple rows or stages or stator vanes and rotor blades to power and aircraft or, in the case of the IGT, drive an electric generator. It is well known in the art of gas turbine engine design that the efficiency of the engine can be increased by passing a higher gas flow temperature through the turbine. However, the turbine inlet temperature is limited by the material properties of the turbine, especially for the first stage airfoils since these are exposed to the highest temperature gas flow. As the gas flow passes through the various stages of the turbine, the temperature decreases as the energy is extracted by the rotor blades.

Another method of increases the turbine inlet temperature is to provide more effective cooling of the airfoils. Complex internal and external cooling circuits or designs have been proposed using a combination of internal convection and impingement cooling along with external film cooling to transfer heat away from the metal and form a layer of protective air to limit thermal heat transfer to the metal airfoil surface. However, since the pressurized air used for the airfoil cooling is bled off from the compressor, this bleed off air decreases the efficiency of the engine because the work required to compress the air is not used for power production. It is therefore wasted energy as far as producing useful work in the turbine.

Recently, airfoil designers have proposed a new air cooled turbine rotor blade or stator vane design that is referred to as a spar and shell airfoil. U.S. Pat. No. 7,080,971 issued to Wilson et al. on Jul. 25, 2006 and entitled COOLED TURBINE SPAR SHELL BLADE CONSTRUCTION discloses one of these latest airfoils, the entire disclosure being incorporated herein by reference. The spar and shell construction allows for the use of a shell that can be made from an exotic high temperature alloy or material such as tungsten, molybdenum or columbium that could not be used in the prior art investment casting blades or vanes. Airfoils made from the investment casting technique are formed from nickel super-alloys and as a single piece with the internal cooling circuitry cast into the airfoil. Film cooling holes are then drilled after the airfoil has been cast. Without much improvement in the cooling circuitry of these investment cast nickel super-alloy airfoils, the operating temperature is about at its upper limit.

Thus, these new spar and shell airfoils will allow for the shell to be formed from the exotic high temperature materials because the shell can be formed using a wire EDM process to form a thin wall shell, and then the shell is supported by a spar to form the blade or vane. The exotic high temperature metals such as tungsten, molybdenum or columbium cannot be cast using the investment casting process because of there very high melting temperatures. However, thin walled shells can be formed using the wire EDM process. With a spar and shell airfoil having a shell made from one of these materials, the operating temperature can be increased way beyond the maximum temperature for an investment cast airfoil. Thus, the engine turbine inlet temperature can be increased and the engine efficiency increased.

One major problem with these new spar and shell rotor blades is securing the shell to the blade assembly without inducing too high of a stress level on the blade spar or tip section. Since the rotor blade rotates in the engine, high stress levels are formed on the blade parts that form the blade assembly. In some designs, the blade tip is formed as part of the spar to maintain low stress levels. In some designs, the blade tip is a separate piece from the spar and thus must be attached to the spar while securing the shell to the blade assembly. Because the blade assembly must be supplied with cooling air to provide cooling for the shell, the spar must not be solid but include at least one central passage for supplying the cooling air to the blade assembly. This hollow spar can result in less metal material in the tip region for the tip cap to be secured to the spar. High stress levels have been observed in computer modeling of various designs for the tip cap and spar connection.

BRIEF SUMMARY OF THE INVENTION

It is an object of the present invention to provide for a turbine rotor blade of the spar and shell construction with a tip cap as a separate piece from the main spar.

It is another object of the present invention to provide for a turbine rotor blade of the spar and shell construction with hooks that secure the shell to the spar and form cooling passages for the blade.

It is another object of the present invention to provide for a turbine rotor blade of the spar and shell construction with an upper serpentine flow cooling circuit and a lower serpentine flow cooling circuit that will minimize an effect of cooling flow leakage across openings in slots used to secure hooks from the shell.

It is another object of the present invention to provide for a turbine rotor blade of the spar and shell construction with a relatively low stress level in the blade tip cap to spar connection of less than 50 ksi.

It is another object of the present invention to provide for a turbine rotor blade of the spar and shell construction with cooling channels for the shell.

These objectives and more can be achieved by the turbine rotor blade with the spar and shell construction in which the spar includes a number of channels formed on the pressure and the suction sides of the spar that form cooling air passages for the blade assembly when the shell is secured onto the spar. Because of these external formed channels on the spar, the tip section of the spar can be large enough to support a tip cap that is secured to the spar through a tongue and groove connection. The tip cap also functions to retain the shell against radial displacement during rotation of the blade assembly.

A main cooling air supply passage extends almost the entire length of the spar and supplies cooling air to the middle cooling channels on the spar through a series of holes located in the spar at a point about midway between the blade tip and the platform. The cooling air flows through the holes and into the two upper serpentine flow passages and two lower serpentine flow passages to provide cooling for the shell on both the pressure side and the suction side of the blade. The cooling air then flows into the leading edge and the trailing edge channels. The spent cooling air is then discharged through rows of film holes on the leading edge and rows of exit holes on the trailing edge of the blade.

BRIEF DESCRIPTION OF THE SEVERAL VIEWS OF THE DRAWINGS

FIG. 4 shows a side view of the spar of the second embodiment of the present invention.

DETAILED DESCRIPTION OF THE INVENTION

The present invention is an air cooled turbine rotor blade that has a spar and shell construction The shell is a thin walled shell to provide for relatively low metal temperature due to backside convection and impingement cooling, the shell being secured to the spar by a number of hooks extending from the shell that prevent bulging of the shell due to high cooling air pressure in channels formed between the spar and the shell, to produce a seal between adjacent cooling channels formed between the shell and the spar, and to allow for a relatively large metal surface in the tip region for attaching a separate tip cap to the spar while maintaining low stress levels at the tip section during rotor blade rotation.

Figure 1:
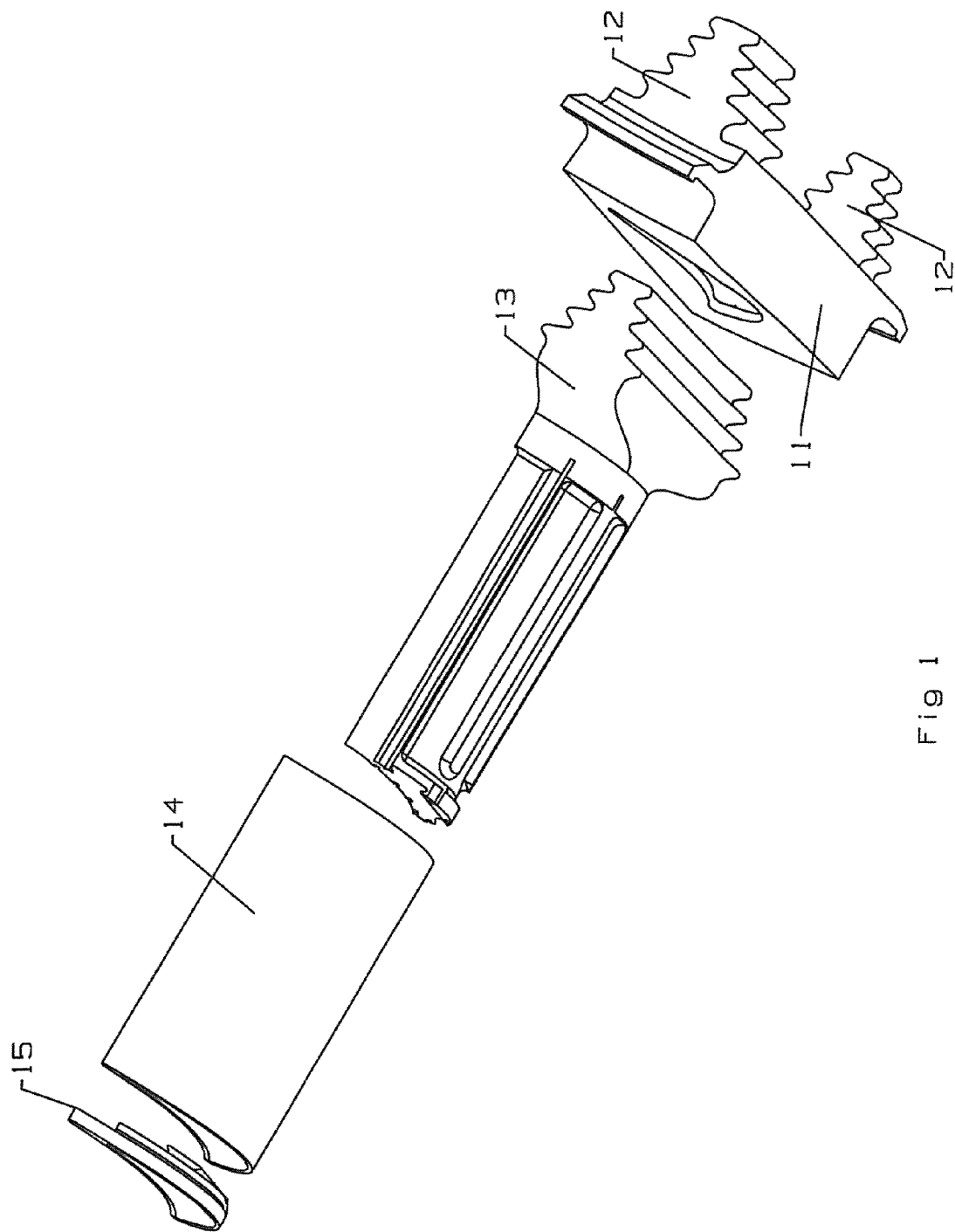
FIG. 1 shows a schematic exploded view of a first embodiment of the spar and shell blade of the present invention.
Figure 2:
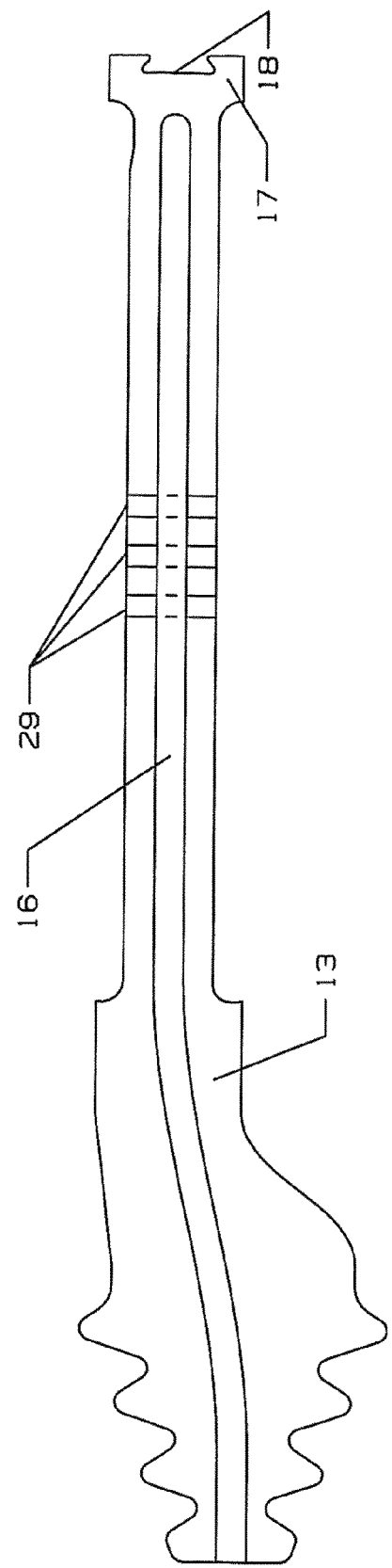
FIG. 2 shows a cross section view of the spar with the cooling supply channel of the present invention for a second embodiment.
Figure 3:
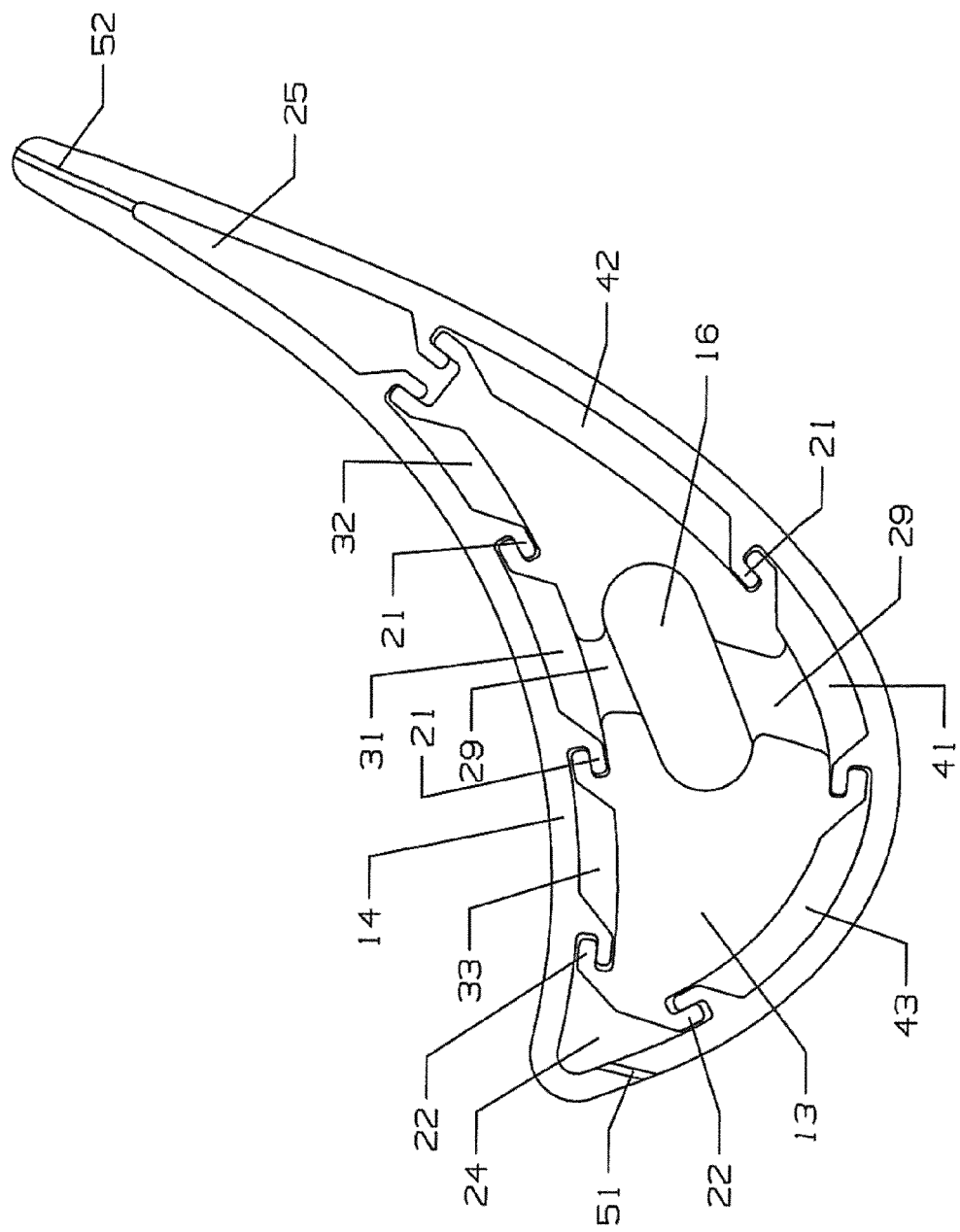
FIG. 3 shows a cross section view of the blade along a line parallel to the spanwise direction of the blade with the shell hooks engaging the slots formed on the spar outer surface for the second embodiment of the present invention.

FIG. 1 shows the turbine rotor blade of the first embodiment of the present invention in an exploded view with a root section 11 that also includes the blade platform, the root section 11 also includes two fir tree legs 12 on the two sides that form a means to secure the blade assembly to a slot in a rotor disk (not shown), a spar 13 that has a fir tree configuration on the bottom end of the same cross section shape as the fir tree legs 12 of the root section 11, a shell 14, and a tip cap 15. The spar 13 also includes a cooling air supply channel 16 that extends from an opening in the root section 13 and ends near to the tip section 17 of the spar 13. The tip section 17 includes a dovetail slot 18 that extends along a chordwise direction on the tip end for insertion of a dovetail projection formed on a bottom side of the tip cap 15. The spar 13 also includes a row of holes 19 that connect the cooling supply channel 16 to both the pressure and suction sides of the spar 13. In the first embodiment, the cooling holes are located at the bottom of the middle cooling passages formed on the outer surface of the spar 13 on both the pressure side and the suction side. In a second embodiment as shown in FIGS. 2 and 3, the cooling supply holes are located at a mid-point between the middle cooling passage formed on the external surface of the spar 13 as seen in FIGS. 2 and 4. The spar 13 can be formed by the well known investment casting process and form conventional materials such as nickel super alloys, while the shell can be formed from an exotic high temperature material such as molybdenum or columbium that could not be cast but must be formed by an EDM process (electro discharge machining).

FIG. 3 shows the shell 14 in place on the spar 13 in a cross section top view for the second embodiment of the spar and shell rotor blade. the spar 13 and the shell 14 both includes hooks 21 and 22 that engage with each other to secure the shell to the spar and prevent the shell from bulging outward due to the high cooling air pressure. Also, the hooks 21 and 22—when engaged together—form the separation walls between the adjacent radial extending cooling air passages that are formed on the outer surface of the spar 13 and between the shell 14. The cooling air flowing through the radial passages will also cool the hooks 21 and 22 because the cooling air will also contact the hooks 21 and 22.

The spar 13 includes a central cooling supply passage 16 to deliver cooling air from a source external to the blade. A middle cooling air passage is formed on both sides of the spar 13 with a pressure side middle passage 31 on the pressure side and a suction side middle passage 41 formed on the suction side wall of the spar 13. Both middle passages 31 and 41 extend the length of the shell as seen in FIG. 4. A row of three pressure side cooling holes 29 and a row of suction side cooling holes 29 connect the central cooling supply passage 16 to the respective middle passages 31 and 41.

The spar 13 also forms cooling air passages on both sides to channel the cooling air from the middle passages 31 and 41 to both of the leading edge passage 24 and the trailing edge passage 25 in a serpentine flow path. The pressure side of the spar 13 includes an upper leading edge passage 33 and an upper trailing edge passage 32 located on the sides of the pressure side middle passage 31. The pressure side of the spar 13 also includes a lower leading edge passage and a lower trailing edge passage also located on the sides of the pressure side middle passage 31.

The spar 13 includes a suction side with similar cooling passages that lead into the leading edge and trailing edge passages 24 and 25. The middle passage 41 is connected to a suction side leading edge passage 43 and a suction side trailing edge passage 42. Like on the pressure side of the spar 13, the suction side also includes an upper serpentine flow passage and a lower serpentine flow passage.

The shell 14 includes a row of film cooling holes 51 connected to the leading edge passage 24 that open onto the suction side surface of the leading edge region. The shell 14 also includes a row of trailing edge exit holes 52 to discharge cooling air from the trailing edge passage 25 and cool the trailing edge region of the shell 14.

The blade assembly is assembled by inserting the spar 13 up through an opening formed in the root section 11 from the bottom end. The root section 11 and the spar 13 are formed so that the spar 13 can be inserted further up through the opening in the root section than required in the final assembly arrangement so that the tip cap can be secured to the dovetail groove 18. With the spar inserted into the opening of the root section 11, the shell 14 is placed over the spar 13 and the spar 13 inserted far enough into the root section opening so that the dovetail slot 18 extends beyond the top edge of the shell so that the dovetail projection on the tip cap can be inserted into the dovetail slot 18. With the tip cap 15 in place on the spar 13, the spar is then backed out of the root section opening 11 so that the fir tree sections on the spar 13 and the root legs 12 are aligned. At this position, the shell is adequately secured between the platform and the tip cap 15. A shallow groove is formed on the platform surface so that the bottom end of the shell can be inserted into. The platform grooves will allow for thermal expansion of the shell within the blade assembly without inducing stress into the tip cap 15 and the spar 13 so that the shell can be thermally uncoupled from the spar.

The slots formed on the spar that receive the hooks on the shell extend below the platform section so that the tip cap can be inserted into the spar with the shell in place. Because the spar 13 will extend further into the opening of the platform so that the spar tip end will extend beyond the top of the shell in order to insert the tip cap into the spar tip groove 18, the slots are required to extend further toward the lower end of the spar. This section of the slots is left open when the shell is in place and forms a leakage flow path for the cooling air. Because of the lower serpentine flow path formed in the spar 13, the leakage path formed by the open slots will be minimized because any leakage flow will be part of the serpentine flow passage in the cooling channels. This leakage path thus becomes part of the normal cooling air flow path for the blade.

The blade assembly is cooled by passing pressurized cooling air through the cooling supply channel 16 of the spar 13. The cooling air then flows through the rows of holes 29 and into the middle channels 31 and 41 on the pressure side and the suction side of the spar 13. as seen in FIG. 4, cooling air that flows through the holes 29 and into the middle channels on both sides of the spar 13 will flow into the upper serpentine flow path and the lower serpentine flow path. The cooling air from the serpentine flow paths on the pressure side and the suction side of the spar 13 will then merge into the leading edge passage 24 or the trailing edge passage 25. The leading edge passage 24 and the trailing edge passage 25 both form a common collection passage for the cooling air from the serpentine flow passages. The cooling air in the leading edge passage 24 will then flow out through the film cooling holes 51 and the cooling air in the trailing edge passage 25 will flow out through the row of exit holes 52.

One of the features of the present invention is that the hooks on the spar and the shell form the cooling air passages. Because of this feature, the cooling air flowing through the passages also acts to cool the hooks. The hooks 21 extending from the shell 14 are hotter than the hooks from the spar because the shell 14 is exposed to the higher temperature.

Because of the structure of the spar with the cooling channels formed on the outer surfaces, the tip region of the spar 13 can be large enough with enough metal material to form the dovetail slot and projection arrangement in order to secure the tip cap to the spar 13 while keeping the stress level low enough in a range of less than 50 ksi but preferably below 40 ksi.

The tip cap 15 will remain secured into position on the spar 13 when the blade assembly is secured into the slot of the rotor disk. Because of the fir tree arrangement on the root section and the spar bottom end, with the fir trees aligned together and inserted into the disk slot, the tip cap will not be capable of sliding out from the tip groove 18 because of the presence of the shell 14 secured between the tip cap 15 and the platform.

I claim the following:

1. An air cooled turbine rotor blade comprising:
   a spar that provides support for a shell in the rotor blade;
   the spar having a pressure side surface and a suction side surface;
   the spar having an internal cooling supply channel extending from an inlet end and ending near to a tip end of the spar;
   the spar forming a pressure side middle cooling passage and a suction side middle cooling passage both extending a length of the shell;
   a first row of pressure side cooling air supply holes is formed in the spar and connects the internal cooling supply channel to the pressure side middle passage;
   a second row of suction side cooling air supply holes is formed in the spar and connects the internal cooling supply channel to the suction side middle passage;
   the pressure side of the spar also forms an upper leading edge passage and a lower leading edge passage, and an upper trailing edge passage and a lower trailing edge passage;
   the suction side of the spar also forms an upper leading edge passage and a lower leading edge passage, and an upper trailing edge passage and a lower trailing edge passage;
   the spar and the shell both form a leading edge passage and a trailing edge passage;
   the upper and lower leading edge passages on the pressure side and the suction side of the spar all open into the leading edge passage; and,
   the upper and lower trailing edge passages on the pressure side and the suction side of the spar all open into the trailing edge passage.

2. The air cooled turbine rotor blade of claim 1, and further comprising:
   the spar and the shell both include hooks that engage together to secure the shell to the spar and prevent bulging of the shell due to high cooling air pressure; and,
   the hooks form the cooling air passages.

3. The air cooled turbine rotor blade of claim 1, and further comprising:
   the shell includes a row of film cooling holes on the suction side connected to the leading edge passage; and,
   the shell includes a row of trailing edge exit holes connected to the trailing edge passage.

4. The air cooled turbine rotor blade of claim 1, and further comprising:
   the cooling air passages formed on the spar form an upper serpentine flow circuit and a lower serpentine flow circuit on both the pressure side and the suction side of the spar;
   the upper serpentine flow circuits and the lower serpentine flow circuits on the leading edge side of the spar discharge into the common leading edge passage; and,
   the upper serpentine flow circuits and the lower serpentine flow circuits on the trailing edge side of the spar discharge into the common trailing edge passage.

5. The air cooled turbine rotor blade of claim 1, and further comprising:
   the shell is formed from a high temperature resistant metal that cannot be cast or machined into a thin wall airfoil.

6. The air cooled turbine rotor blade of claim 5, and further comprising:
   the shell is formed from an electric discharge machining process.

7. The air cooled turbine rotor blade of claim 6, and further comprising:
   the shell is formed from Molybdenum or Columbium.

8. An air cooled turbine rotor blade comprising:
   a spar having an upper section with a pressure side surface and a suction side surface that forms an upper serpentine flow circuit and a lower serpentine flow circuit;
   the spar having a lower section that forms a fir tree configuration for insertion into a slot of a rotor disk;

a platform and root section with a first leg and a second leg both having a fir tree configuration of similar cross section shape to the lower end of the spar;

the platform section and root section having an opening between the two legs in which the spar can be inserted;

a tip cap with a dovetail projection extending from a lower end;

the spar having a tip end with a dovetail shaped groove sized and shaped to receive the dovetail projection of the tip cap; and, a shell having an airfoil cross sectional shape with a leading edge and a trailing edge and a pressure side wall and a suction side wall extending between the two edges;

the shell being secured between the tip cap and the platform of the platform and root section.

9. The air cooled turbine rotor blade of claim 8, and further comprising:

the spar and the shell both includes hooks that engage together to secure the shell against bulging due to cooling air pressure; and, the hooks form the serpentine cooling flow circuits.

10. The air cooled turbine rotor blade of claim 8, and further comprising:

the spar includes a central cooling air supply channel; and, a row of pressure side cooling supply holes and a row of suction side cooling supply holes to connect the central cooling air supply channel to the serpentine flow circuits on the pressure side and the suction side of the spar.

11. The air cooled turbine rotor blade of claim 10, and further comprising:

the rows of cooling air supply holes are located in a middle section of the cooling passages of the spar.

* * * * *